Nov. 13, 1951

H. B. WHITE 2,574,993

TOASTER TIMING MECHANISM

Filed April 20, 1949

INVENTOR.
Harry B. White
BY
*Harry S. Dumarr*
ATTORNEY.

Nov. 13, 1951 H. B. WHITE 2,574,993
TOASTER TIMING MECHANISM
Filed April 20, 1949 3 Sheets-Sheet 2

INVENTOR.
Harry B. White
BY
Harry S. Ducasse
ATTORNEY.

Patented Nov. 13, 1951

2,574,993

UNITED STATES PATENT OFFICE 2,574,993

TOASTER TIMING MECHANISM

Harry B. White, Canton, Ohio, assignor to The Hoover Company, North Canton, Ohio, a corporation of Ohio Application April 20, 1949, Serial No. 88,673

8 Claims. (Cl. 161—1)

The present invention relates to the art of cooking devices and more particularly to a novel control mechanism for timing the operating time of cooking ovens such as bread toasters and is an improvement upon the invention disclosed and claimed in the copending application of George P. Daiger, Serial No. 38,411, filed July 13, 1948, for "Toasting Apparatus" assigned to the assignee of the instant application.

It is difficult to regulate the duration of the operating periods of automatic toasters because of the temperature changes occurring in the oven when several toasting periods follow each other in close succession. The problem is aggravated by the comparatively long period required for the initial toasting period which is followed by successively shorter toasting periods until the toasting mechanism reaches an equilibrium condition. Previous efforts to solve this problem have not been entirely successful and have involved the use of complicated and expensive mechanisms. A major problem in designing the timer has been the great difference in the time required for the first and second toasting operations. The degree of shortening of the toasting operation after the second operation is not very great and is more readily achieved if the initial toasting operation is governed by special timing means.

Accordingly, it is an object of the present invention to provide a toasting mechanism in which a single thermal element timing device is so designed that it will properly time the second and all subsequent toasting periods within itself. The long first toasting period is accomplished by imposing a mechanical bias upon the timer from which the timer automatically frees itself whenever the thermal element temperature exceeds a predetermined value.

It is a more specific object of the present invention to provide a toaster timing mechanism in which the thermal element is arranged to move its operating part through a constant range of movement to accomplish a timing operation and in which the thermostat automatically compensates itself for the desired shortening of closely succeeding toasting periods by approaching closer and closer to the heating element. It is an additional object of the present invention to provide a toaster timing mechanism in which the thermal element always operates its actuating element through a short and constant range of movement and in which the thermal element must first build up in itself a thermal stress equal to an externally applied mechanical stress before beginning its operating range of movement upon an initial timing cycle or under any condition where the temperature of the timing element is below a predetermined value at the initiation of a timing period.

Other objects and advantages of the invention will become apparent as the description proceeds when taken in connection with the accompanying drawings in which.

Figure 1:
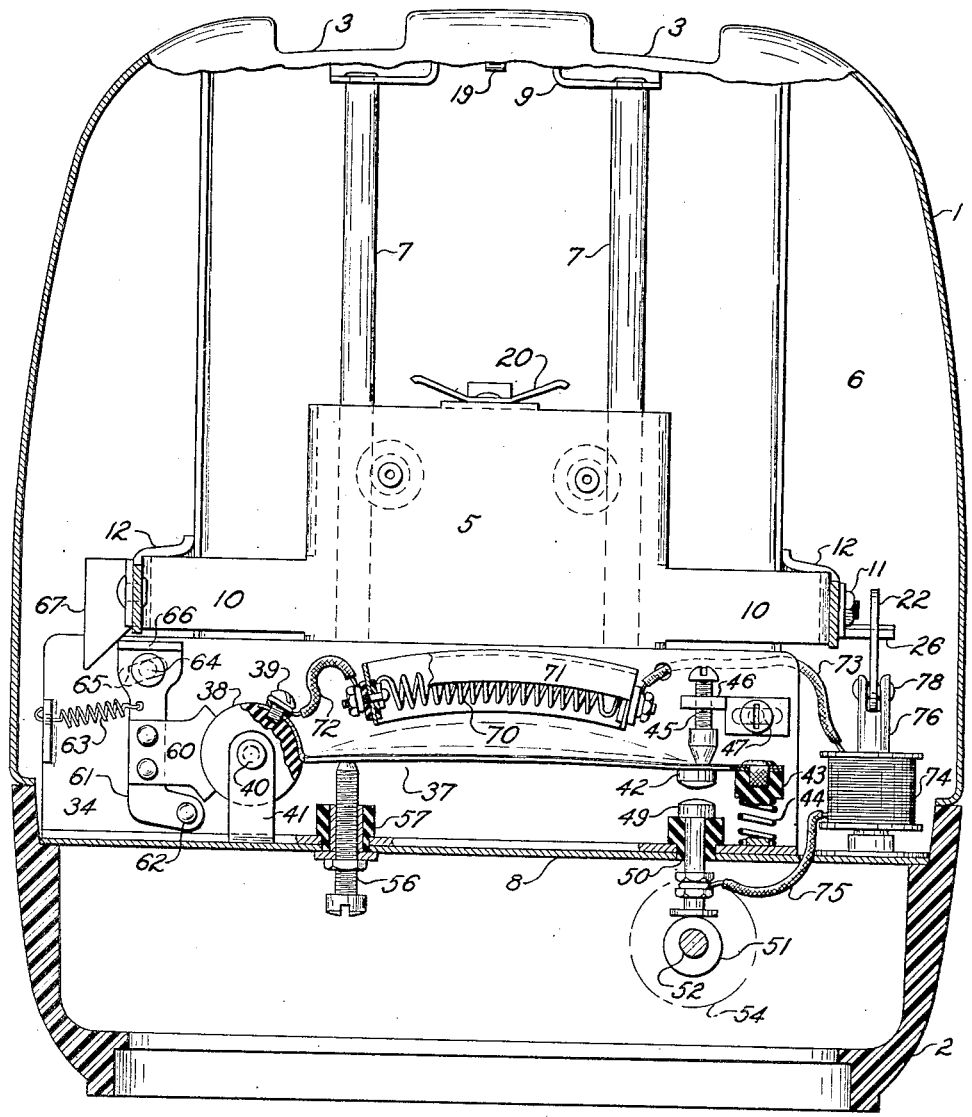
Figure 1 is an end elevational sectional view of a toasting mechanism embodying the novel timing mechanism of the present invention.

The toasting mechanism comprises an outer casing 1 which is suitably secured to a supporting base 2 preferably of insulating material. The outer casing 1 is provided with one or more slots 3 which provide access to the interior toasting oven defined, as is conventional, by electrical heating elements 4. A movable bread supporting rack, not shown, is provided in each oven in a known manner. These racks are supported by a slide plate 5 positioned in the control chamber 6 in one end of the shell 1. The slide plate 5 is slideably mounted upon upstanding posts 7 extending from the bottom wall 8 of the chamber 6 to a top frame plate 9 in the chamber 6.

The slide plate 5 has side wings 10 slideably connected at 11 to a pair of actuating arms 12 extending on opposite sides of the toasting oven. The arms 12 are pivotally mounted at the far end of the toaster in any conventional manner, not shown, and extend around the inner end wall of the shell 1 to a junction at which point they are provided with a projecting tongue 14 which carries a carriage actuating handle 15. The tongue 14 extends through a slot 16 in the center portion of the end wall of the shell 1. A tension spring 17 connects between a hook 18 at the junction of the arms 12 and a hook 19 carried by the frame plate 9. This spring biases the arms 12 to the upper position in which the toast carriage will be raised to toast ejecting position and the slide plate 5 will be at the upper portion of its range of movement. The top of the slide plate 5 carries a spring 20 designed to contact the lower surface of the frame plate 9 to cushion the stopping of the plate 5.

Figure 2:
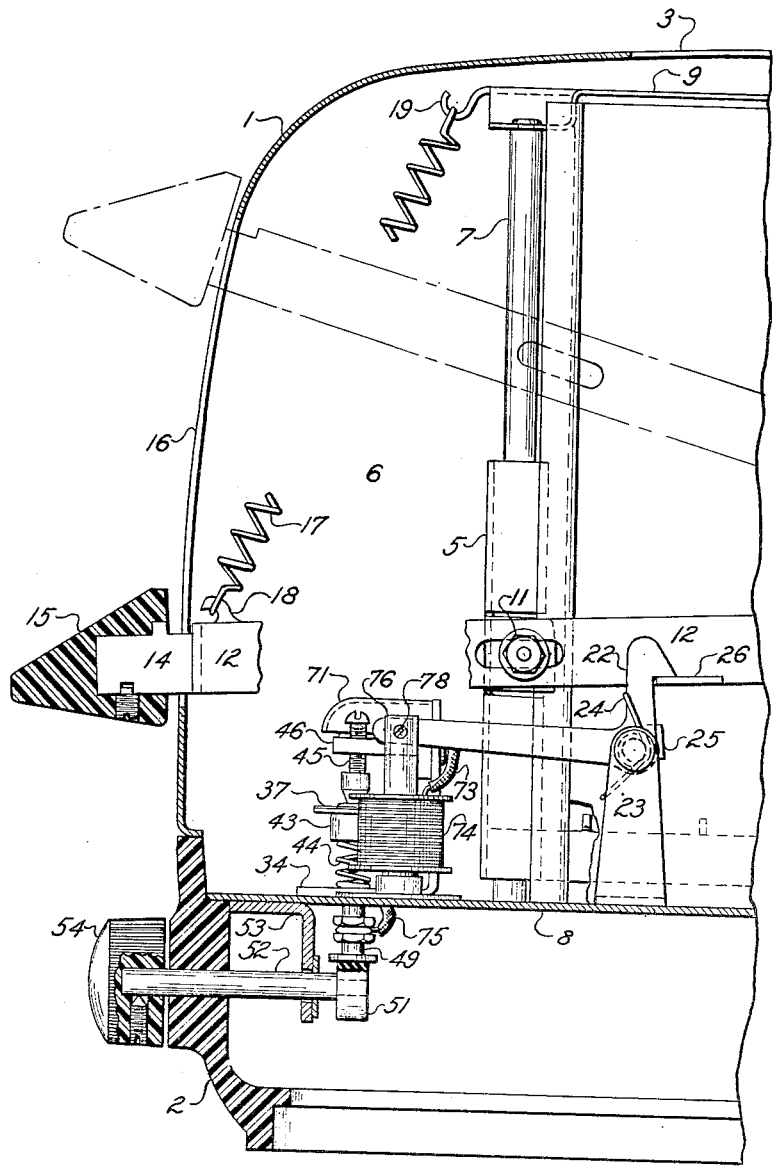
Figure 2 is a side sectional elevational view of a portion of the mechanism illustrated in Figure 1.

The toast carriage is held down in the lower toasting position, illustrated in Figure 2, by means of a bell crank shaped latch 22 pivotally mounted upon a standard 23 secured to the bottom plate 8 of the toaster. A torsion spring 24 biases the latch 22 in a clockwise direction as viewed in Figure 2 to the extent permitted by a fixed stop 25. The carriage raising and lowering arm 12 on the right hand side of the toaster, as viewed in Figure 1, is provided with a latch tongue 26 in position to pass over and be engaged by the latch 22 to hold the carriage in lower toasting position as is illustrated in Figure 2.

Figure 3:
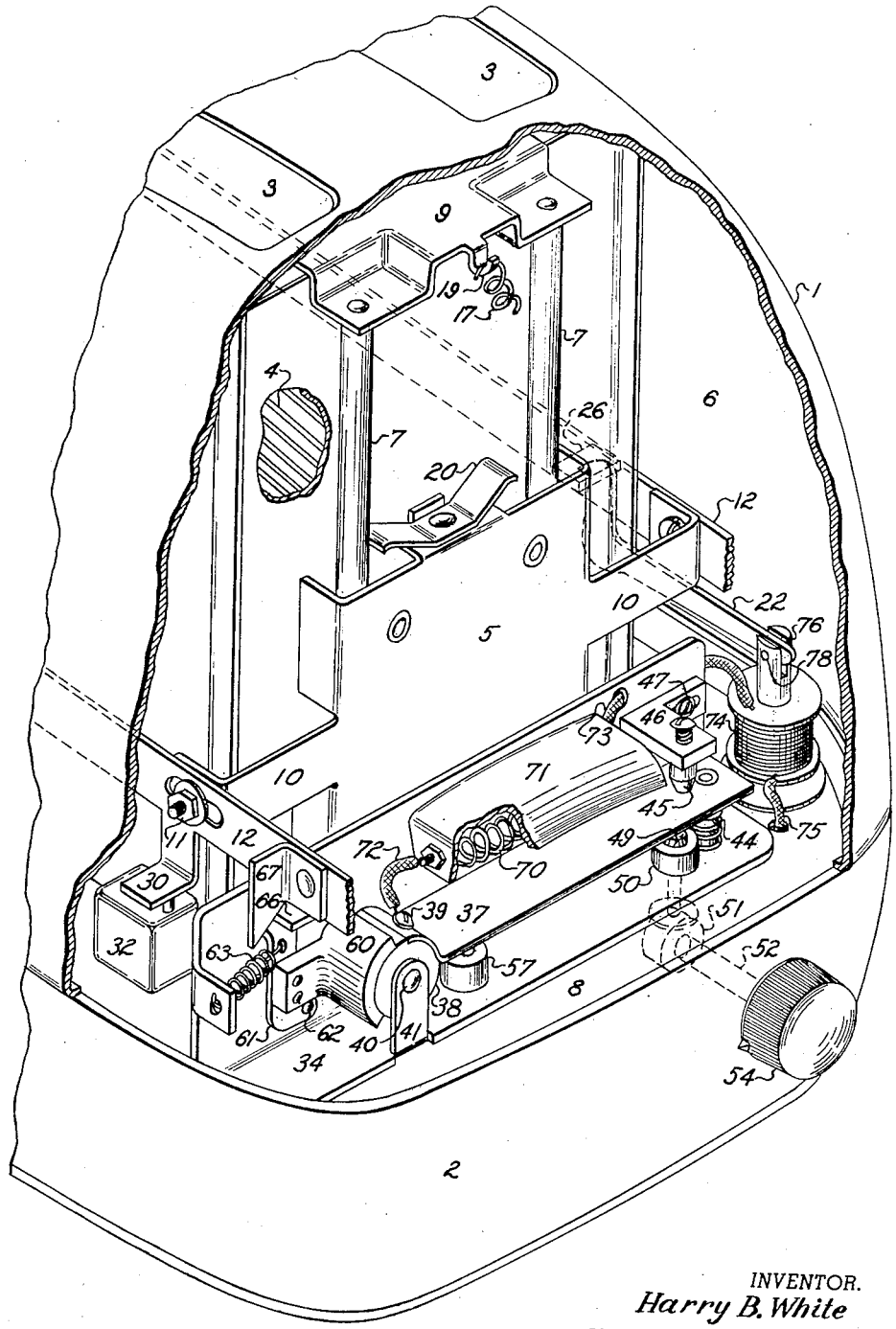
Figure 3 is a perspective view of the mechanism of Figures 1 and 2.

The left hand carriage raising and lowering arm 12, as viewed in Figure 3, is provided with a depending presser foot 30 which is adapted to actuate a normally open circuit electrical control switch 32 to close the control circuit for the apparatus when the toast carriage is latched in its lower toasting position.

The timing mechanism per se for the toasting apparatus is mounted upon an L-shaped plate 34 secured to the base plate 8 of the toaster in the end chamber 6. This mechanism consists of a bimetallic thermostatic element 37 anchored at one end by a stud 39 to a cylinder 38 of insulating material. The cylinder 38 is rotatably mounted upon a spindle 40 which is pivotally supported by the vertical wall of the L-shaped plate 34 and a standard 41 carried by the horizontal portion of the L-shaped plate 34. The thermostatic element 37 extends substantially horizontally and carries an electrical contact button 42 adjacent its outer end. The outer end of the thermostat carries an insulating button 43 which seats upon a compression spring 44 resting on the upper face of the horizontal portion of the plate 34. The compression spring 44 biases the thermostat 37 upwardly into contact with the lower end of a threadably mounted adjustable stop 45. The stop 45 is carried by a supporting element 46 which is horizontally adjustably mounted on the vertical wall of the plate 34 by means of a lock screw and slot 47. A second electrical contact 49 is positioned directly beneath the electrical contact 42 and is slideably mounted in an insulating grommet 50 supported by and extending through the plates 8 and 34 to insulate this contact from the structure of the toasting mechanism. The lower end of the contact 49 rests upon an eccentric cam 51 carried on the end of a shaft 52 which is journalled in the front wall of the base structure 2 of the toaster and an L-shaped bracket 53 depending from the plate 8. An adjusting knob 54 is carried by the shaft 52 on its outer end whereby rotation of this knob raises and lowers the contact 49 with respect to the contact 42 and hence varies the distance which the thermostat must move to time a toasting operation. The cam 51 or the portion of the slideable contact 49 resting on the cam is made of insulating material to isolate the conducting portion of contact 49 electrically.

An adjustable stop bolt 56 abuts the under face of the thermostat 37 adjacent its point of connection to the mounting drum 38. The stop 56 is threaded through an insulating support structure 57 secured to the plates 8 and 34.

The rotatably mounted drum 38 is adapted to be maintained in fixed position by being engaged by a brake shoe 60 which is carried by a brake support arm 61 pivotally mounted at 62 on the bracket 34. A tension spring 63 connected between the brake arm 61 and a portion of the bracket 34 urges the brake into the off position in which the shoe 60 is removed from contact with the drum 38. Movement of the brake arm 61 under the influence of the spring 63 is limited by a pin 64 on the upper portion of the brake arm which extends through a slot 65 in the bracket 34. The top portion of the arm 61 is provided with a flange 66 positioned in the path of movement of the inclined edge of a brake operating flange 67 carried by the left hand raising and lowering arm 12, as viewed in Figure 1. The parts are so arranged that the inclined surface on the actuator 67 engages the flange 66 and rotates the arm 61 in a clockwise direction to engage the shoe 60 firmly with the drum 38 to prevent rotation thereof when the toast carriage is latched in toasting position. When the toast carriage is in its raised toast ejecting position the elements 66 and 67 are separated from each other and the spring 63 operates to rock the arm 61 to release the brake and permit rotational movement of the drum 38.

An auxiliary electrical heating element 70 is carried within a reflecting shield structure 71 supported from the vertical or upstanding portion of the bracket 34. The heating element may be mounted in any suitable way within the supporting element 71 it being only necessary to position it above the thermostat 37 and to insulate it electrically from its supporting means. As shown, the electrical heating element and its support are arcuate for a purpose to be described more fully hereinafter. One end of the heating element 70 is electrically connected to the thermostat 37 by an electrical conductor 72 which seats under the stud 39. The other end of the heater 70 is electrically connected by means of a conductor 73 to a solenoid energizing coil 74 which is in turn electrically connected by means of a conductor 75 to the contact 49. The auxiliary heating element 70 may be connected to be energized across the supply line in case a high voltage heater is desired or in series with the heating element 4 in case a low voltage heating element is desired. Whichever choice is made the energizing coil 74 must be wound for high or low voltage accordingly as it is in parallel with the heating element 70 and is under the control of the contacts 42—49 as is apparent from the electrical circuit just described. The normally open line switch 32 will control the heating elements 4 and 70 whichever method of connection is desired. The switch 32 may open either or both electric supply lines as desired. These connections are of a conventional type and have been omitted from the drawing for clarity. If the high voltage circuit for the heating element 70 and solenoid coil 74 is desired the heating element 70 will be connected to the energizing line directly through the switch 32. If the low voltage arrangement is preferred one end of the heating element 70 will be connected to one end of the heating element 4 and the other ends of these elements will be connected to the line through the switch 32.

The solenoid energizing coil 74 is arranged when energized to attract a plunger 76. The upper end of the plunger 76 is pivotally connected at 78 to the latch 22. It is apparent from an inspection of Figure 2 that the latch 22 will rotate in a counter-clockwise direction to release the toast carriage when the plunger 76 is attracted into the energizing coil 74.

The various parts of the toaster will be designed to approximate the exact timing conditions required. Variations from the norm are corrected by adjustment of the stops 45 and 56. Since the control of all but the initial toasting operation is independent of the stop 56 it is necessary to adjust the stop 45 first. One adjusting procedure is as follows: The stop 56 is retracted until it is completely clear of the thermostat 37. The toaster is then operated for a period of time previously determined as that required by the particular oven to produce toast of a certain desired coloration. This must be accomplished without the intervention of the automatic control as by manually holding the carriage in the toasting position. At the end of the aforesaid predetermined period the toaster is allowed to cool for approximately 10 seconds and is then immediately recycled. The stop 45 is then adjusted during this second operating period to terminate it after the lapse of the proper time period. Several trials may be necessary to achieve correct adjustment of the stop 45. When this adjustment has been secured the toaster is allowed to cool and is cycled once adjusting the stop 56 until the desired initial timing condition is achieved. When the stops 45 and 56 have thus been adjusted, the stop 56 will force the thermostat 37 against the stop 45 and produce an appreciable mechanical stress therein when the toasting apparatus is allowed to cool to room temperature. After the initial adjustment of the control stop, the thermostat is required to develop a thermal stress internally of itself to relieve the mechanical stress produced therein by the stop 56 before flexure begins which moves the thermostat away from the stop 45 and in a direction to complete the electrical circuit between the contacts 42 and 49.

After the stops 56 and 45 are properly adjusted the toasting operation is substantially as follows: Assuming that the parts are at room temperature, the fixed stop 56 will urge the thermostat 37 against the stop 45 with sufficient force to bow the thermostat slightly to produce a mechanical stress therein. The thermostat must heat to a considerable degree in order to bow upwardly as viewed in Figure 1 before its thermally induced stress balances the mechanical stress produced by the stop 56 and the contact 42 can begin to approach the contact 49 due to thermal flexure of the thermostat. This mechanical bias introduces a considerable delay in the operating period of the thermostat for an initial toasting cycle which is desirable because of the time required to heat the oven and to bring the parts to operating condition. Immediately the toasting period is terminated the carriage is released and rises to its upper toast ejecting position. This action releases the brake shoe 60 from the drum 38 and the spring 44 then rocks the thermostat 37 and the drum 38 in a counter-clockwise direction as viewed in Figure 1 against the stop 45. At this time the thermostat 37 is sufficiently flexed so as to be free of mechanical contact with the stop 56 in which condition it remains for a short period until it cools sufficiently to again contact that stop 56. If a toasting period is initiated closely following the first toasting period the brake shoe is locked in such position that the thermostat is against the stop 45 but is flexed upwardly into one of the dotted line positions shown in Figure 1 thus freeing it from the stop 56 and also decreasing its radius of curvature to bring the thermostat closer to the arcuate heating element 70. Under these conditions of operation the toasting period is much shorter than the initial one which compensates for the shorter time required to bring the bread to a uniform toasting condition because of the initial high temperature of the oven and surrounding parts of the toasting mechanism. The foregoing sequence of operation may be repeated any number of times it is desired to produce toast in closely following order. As the temperature of the thermostat and oven gradually increases the degree of flexure of the thermostat at the initiation of a toasting period also increases so that it approaches the heating element 70 more and more closely and progressively decreases the time required for the heater to heat the thermostat sufficiently to terminate a toasting operation. If toasting periods follow each other in close succession the foregoing sequence continues until the oven temperature and thermostat temperature reach equilibrium after which there will be no net increase in the initial flexure of the thermostat 37 at the beginning of each toasting period.

The foregoing mechanism provides a single thermostatic element which automatically resets itself to a constant relation to the terminating mechanism at the end of each toasting operation and compensates itself for variation in the time period required for toasting operations in accordance with the ambient condition of the toasting oven. In some constructions, that is depending upon the thermal loss characteristics of the particular oven, the thermostat mechanism may operate so that the fixed stop 56 produces a small thermal stress upon the thermostat at the initiation of the second toasting operation. This does not in any way change the principle of the invention. It is characteristic of the present invention that the thermostat automatically compensates increasing oven temperatures by initiating each toasting operation from a condition in which it is progressively closer to the auxiliary heating element. A long first period is provided by introducing a mechanical stress in the thermostat in such direction that it must be counterbalanced by an equal thermal stress before the thermostatic mechanism can begin its toasting period terminating operation and in which the thermostat itself eliminates the mechanical bias as long as the oven and thermostat temperatures are above a predetermined value. By this subsequent elimination of an artificial mechanical bias of the thermostat the functioning of the thermostat is greatly improved and it does not have to compensate directly for the extremely wide variation between the first and second toasting operations. The degree of variation between successive toasting operations after the first such operation is comparatively small and is readily compensated for by the increasing flexure of the thermostat approaching the auxiliary heating element on succeeding toasting operations.

While I have illustrated and described the invention in considerable detail, it is to be understood that various changes may be made in the arrangement, proportion and construction of parts without departing from the spirit of the invention or the scope of the appended claims.

I claim:

1. Toaster timing means comprising a thermal element, means mounting said thermal element for bodily movement, a stop, means urging said thermal element against said stop, a heating element arranged to heat said thermal element to cause the same to move away from said stop by the thermal stress produced by said heating element, manually settable means for simultaneously energizing said heating means and for securing said thermal element against bodily movement on said mounting means to initiate a timing period, means operated by movement of said thermal element a predetermined distance away from said stop to release said securing means and to de-energize said heating means to terminate a timing period, and means mechanically biasing said thermal element against said stop as long as said thermostat is below a predetermined temperature.

2. In a toaster of the type having a part movable between toasting and non-toasting positions and biased to non-toasting position, means for securing said movable part in toasting position, the combination of a timing mechanism comprising a thermal mechanism including a thermostat for releasing said movable part from said securing means in response to a heat induced operation of said thermostat, means movably mounting said thermostat, a stop positioned in spaced relation to the position occupied by said thermostat when operating said timing mechanism to release said securing means, means biasing said thermostat against said stop, a heating means in spaced relation to said thermostat, means operative by movement of said movable part to toasting position for locking said thermostat against bodily movement and for energizing said heating means, and means operative to impose a mechanical stress upon said thermostat opposing operation thereof to release said securing means as long as said thermostat is below a predetermined temperature.

3. Toaster timing mechanism comprising means movable between toasting and non-toasting positions and biased to non-toasting position, means for holding said movable means in toasting position including an actuating member for releasing said holding means to terminate a toasting operation, a rotatably mounted drum, a bimetallic thermostat having one end secured to said drum and its other end positioned to contact and operate said actuating member to release said movable means, a stop, resilient means biasing said thermostat away from said terminating means against said stop, means operative when said movable means is in toasting position for securing said drum against movement, a heating element for heating said thermostat and positioned in spaced relation thereto, and a fixed abutment positioned to engage said thermostat on the side thereof opposite to said heater to force said thermostat against said stop until the temperature thereof exceeds a predetermined value.

4. In a toaster timer, a thermostat of the type which arches in response to an increase in its temperature, an arcuate heating element for heating said thermostat arranged in spaced relation to the side of said thermostat which becomes convex when heated, means mounting said thermostat for bodily movement toward and away from said heating element, means biasing said thermostat for movement toward said heating element, a stop for limiting movement of said thermostat toward said heating element, toasting operation initiating means including means for energizing said heating element and means for securing said mounting means to prevent bodily movement of said thermostat during a toasting period, toasting period terminating means for de-energizing said heating means and for releasing said movable mounting means including an actuating part positioned to be engaged by heat induced movement of said thermostat away from said stop, and additional means mechanically holding said thermostat against said stop until the heat induced arching of said thermostat exceeds a predetermined value.

5. In a toaster timer, a thermostat of the type which arches in response to an increase in its temperature, an arcuate heating element for heating said thermostat arranged in spaced relation to the side of said thermostat which becomes convex when heated, means mounting said thermostat for bodily movement toward and away from said heating element, means biasing said thermostat for movement toward said heating element, a stop for limiting movement of said thermostat toward said heating element, toasting operation initiating means for energizing said heating element and for securing said mounting means to prevent bodily movement of said thermostat during a toasting period, toasting period terminating means for de-energizing said heating means and for releasing said movable mounting means including an actuating part positioned to be operated by heat induced movement of said thermostat away from said stop, and a fixed abutment mechanically stressing said thermostat against said stop as long as its heat induced radius of curvature exceeds a predetermined value.

6. In a toaster timer, an elongated bimetallic thermostat, a stop, means biasing one end of said thermostat against said stop, a timing period terminating mechanism including an actuating part positioned to be engaged by said one end of said thermostat when moving away from said stop by heat induced deflection in said thermostat, means movably mounting the other end of said thermostat to allow heat induced deflection thereof without moving said one end away from said stop, means for heating said thermostat and for securing said other end of said thermostat against movement during timing operations, and additional means mechanically holding said one end of said thermostat against said stop until the heat induced deflection of said thermostat exceeds a predetermined value.

7. In a toaster timer, an elongated bimetallic thermostat of the type which arches when heated, an arcuate heater for heating said thermostat positioned in spaced relation to the face of said thermostat which becomes convex as the thermostat deflects due to increase in temperature, a stop, means biasing one end of said thermostat against said stop, a timing period terminating mechanism including an actuating part positioned to be actuated by heat induced deflection of said one end of said thermostat away from said stop, means movably mounting the other end of said thermostat to allow heat induced deflection of said thermostat without moving said one end of said thermostat away from said stop, a second stop positioned to engage the face of said thermostat which becomes concave when heated between the ends thereof to maintain said one end of said thermostat against said first mentioned stop as long as said thermostat is below a predetermined temperature, and means for energizing said heater and for securing said other end of said thermostat during timing operations.

8. In a toaster timer, a thermostat of the type which deforms when heated, a heater positioned to heat said thermostat, timing period terminating mechanism having an actuating member positioned to be operated by a part of said thermostat when said thermostat undergoes heat induced deformation means biasing said part of said thermostat and said actuating member into a predetermined relation, means mounting said thermostat for movement to allow heat induced deformation of said thermostat without disturbing said predetermined relation, timing period initiating mechanism including means for energizing said heater and means for securing said mounting means against movement, and means for blocking movement of said part of said thermostat with respect to said actuating member until the temperature of said thermostat exceeds a predetermined value.

HARRY B. WHITE.

REFERENCES CITED

The following references are of record in the file of this patent:

UNITED STATES PATENTS

| Number | Name | Date |
|---|---|---|
| 2,179,811 | Brosseau | Nov. 14, 1939 |
| 2,196,393 | Ireland | Apr. 9, 1940 |
| 2,197,221 | Koci | Apr. 16, 1940 |
| 2,436,735 | Walder et al. | Feb. 24, 1948 |
| 2,459,169 | Koci | Jan. 18, 1949 |